United States Patent [19]

Schaugaard et al.

[11] Patent Number: 5,674,417
[45] Date of Patent: *Oct. 7, 1997

[54] METHOD AND APPARATUS FOR WELDING SHUT A GAS PASSAGE IN VESSELS

[75] Inventors: David M. Schaugaard, Brigham City; Kenneth J. Clark, Layton, both of Utah

[73] Assignee: Morton International, Inc., Chicago, Ill.

[*] Notice: The portion of the term of this patent subsequent to Oct. 28, 2013, has been disclaimed.

[21] Appl. No.: 357,418

[22] Filed: Dec. 16, 1994

Related U.S. Application Data

[63] Continuation-in-part of Ser. No. 144,666, Oct. 28, 1993, Pat. No. 5,424,509.
[51] Int. Cl.⁶ ............................................. B23K 9/167
[52] U.S. Cl. .......................... 219/137 R; 53/83; 219/75; 219/136
[58] Field of Search .......................... 219/137 R, 121.64, 219/136, 72, 74, 75; 228/60; 280/737; 53/83

[56] References Cited

U.S. PATENT DOCUMENTS

| | | |
|---|---|---|
| 378,976 | 3/1888 | Ritchie . |
| 2,435,747 | 2/1948 | Larson ................................ 226/20 |
| 3,033,972 | 5/1962 | Stedman ............................. 219/74 |
| 3,392,438 | 7/1968 | Coulter et al. ..................... 29/477 |
| 3,426,170 | 2/1969 | Miller ................................. 219/74 |
| 3,683,148 | 8/1972 | Boyko et al. ...................... 219/137 |
| 3,966,228 | 6/1976 | Neuman ............................. 280/737 |
| 4,003,788 | 1/1977 | Boyko et al. ...................... 176/79 |
| 4,255,916 | 3/1981 | Blankenship et al. ............. 53/404 |
| 4,262,472 | 4/1981 | Soeda et al. ....................... 53/403 |
| 4,361,248 | 11/1982 | Soeda et al. ..................... 220/254 |
| 4,570,051 | 2/1986 | Miwa ................................ 219/137 R |
| 4,727,233 | 2/1988 | Pavese et al. .................... 219/121 PK |
| 5,041,715 | 8/1991 | Muller .............................. 219/721.64 |
| 5,078,422 | 1/1992 | Hamilton et al. ................ 280/736 |
| 5,152,452 | 10/1992 | Fendel ............................. 228/184 |
| 5,158,740 | 10/1992 | Boatwright ...................... 376/261 |
| 5,196,669 | 3/1993 | Richardson ...................... 219/117.1 |
| 5,257,819 | 11/1993 | Frantom et al. ................. 280/737 |
| 5,263,740 | 11/1993 | Frey et al. ....................... 280/737 |
| 5,303,277 | 4/1994 | Yaginuma ........................ 376/451 |
| 5,424,509 | 6/1995 | Schaugaard et al. ............ 219/137 R |

*Primary Examiner*—Clifford C. Shaw
*Attorney, Agent, or Firm*—George W. Rauchfuss, Jr.; Gerald K. White

[57] ABSTRACT

A method and apparatus especially useful for supplying inert gas to a highly pressurized pressure vessel, such as a hybrid inflator for an automotive airbag module, and weld sealing the gas passage or opening therein to avoid or substantially eliminate weld cracks. The apparatus for accomplishing same comprises no moving parts and the welding is accomplished by utilizing either a groove or a conical rise feature formed into the end plug or wall surface of the pressure vessel wall surrounding the gas passage or opening so that no additional filler material is required to obtain the weld seal. The method and apparatus may also be used to weld seal low or non-pressurized vessels as well as vacuum vessels.

4 Claims, 2 Drawing Sheets

METHOD AND APPARATUS FOR WELDING SHUT A GAS PASSAGE IN VESSELS

RELATED APPLICATION

This Application is a continuation-in-part of allowed application Ser. No. 08/144,666, filed Oct. 28, 1993 now U.S. Pat. No. 5,424,509.

FIELD OF THE INVENTION

This invention relates to a method and apparatus especially useful for filling a pressure vessel with an inert gas to a high level of pressurization and weld sealing the gas passage or opening to avoid or substantively eliminate weld cracks. More particularly, this invention relates to a method and apparatus, with no moving parts, for filling a pressure vessel of an automotive airbag module with an inert gas to a high level of pressurization and weld sealing the gas passage or opening in the pressure vessel by use of either a groove or a conical rise feature formed in the end plug or wall surface of the pressure vessel such that no additional filler material is required. The method and apparatus may also be used to weld shut a hole or gas passage in low or non-pressurized vessels as well as vacuum vessels.

BACKGROUND OF THE INVENTION

For a number of years airbags have been installed in a number of automotive vehicles as a safety feature and their use is increasing greatly. As a matter of fact, the Surface Transportation Safety Act requires passenger and driver side airbags on all passenger cars by the 1998 model year and on light trucks by the 1999 model year.

While in the past such airbags have employed a pyrotechnic-type inflator, more recently inflators of a hybrid-type have been employed. A hybrid-type inflator houses both a highly pressurized inert gas, such as argon and helium, stored in a pressure vessel and also a pyrotechnic gas-generating material. In operation, in one embodiment, when a sensor detects an imminent collision and thus the need for immediate inflation of the airbag, the pyrotechnic material is ignited forming a heated gas which ruptures a seal and is directed into the stored pressurized gas in the pressure vessel, which stored gas is heated and expanded from ambient temperature by the igniter gas. The heated, expanded gas in the pressure vessel reaches a pressure sufficient to rupture a second seal thereby permitting flow of the gas into a folded airbag for inflation and deployment thereof. An advantage of the hybrid-type inflator system is its lower cost and the fact that it generates less heat in the airbag than a pyrotechnic-type inflator.

The use of hybrid-type inflators for airbag modules has produced a number of challenges. Among these challenges is the ability to pressurize and seal a highly-pressurized pressure vessel at an appropriate level of pressurization and to do so in such a manner as to avoid weld leaks. Prior to the present invention, one method of filling and sealing of such a pressure vessel for a hybrid-type inflator of an airbag module employed a system and apparatus for supplying a single welding ball at a time through a seal system to the opening to be welded while maintaining an insulated seal around the opening of the pressure vessel to prevent leakage of the high pressure gas and to guard against shorting and arcing. In general, in such a system, a ball is dropped into a conical-shaped gas passage port or opening in the inflator pressure vessel and subject to resistance welding by moving a retracted welding electronic element of the apparatus into an extended welding position and thereafter supplying a welding current to said welding electrode to weld the ball in the gas passage port or opening and thereby seal same and thereafter retracting the welding electrode and restoring the ball delivery system. Such a welding system is disclosed, for example, in U.S. Pat. No. 5,196,669, issued Mar. 23, 1993 to Ronald W. Richardson and assigned to RWC, Inc. of Bay City, Mich., and is currently marketed by said company as its Model 6000 Pressurized Fill Welding Machine.

However, it will be appreciated that the aforedescribed process and apparatus is complex. Numerous drawbacks exist with such a process and apparatus in addition to their complexity. For example, the welding balls are occasionally not properly aligned in the pressure vessel port or opening, the welding process produces a product with a definite fusion line and cracks are often formed or developed along the fusion boundary or fusion line. Moreover, such apparatus is complex and expensive to produce and does not always readily permit the manufacture of pressurized vessels in an easy, effective and efficient manner.

It would therefore be desirable to provide an improved method and apparatus for filling a pressure vessel to a relatively high pressure level and weld sealing the gas passage or opening in the pressure vessel without the need for additional filler material. It would also be desirable to provide such an improved method and apparatus whereby weld cracks are avoided or substantially eliminated. It would be even more desirable to provide such an improved method and apparatus which requires no moving parts and thus is easy to produce and operate. A still more desirable object would be to provide an improved method and apparatus for filling an airbag module inflator pressure vessel with an inert gas to a pressure of 2850 psi or greater and weld sealing the inert gas passage or opening in the inflator pressure vessel and to do so without additional filler material so as to avoid or substantially eliminate cracks in the weld by employing an apparatus requiring no moving parts.

BRIEF SUMMARY OF THE INVENTION

In the process of this invention for supplying and filling a metal pressure vessel with an inert gas to a high level of gas pressurization through a gas passage or opening in the wall surface of the pressure vessel and then weld sealing said gas passage or opening, either a groove or conical rise feature is provided on the end plug or side wall surface of the pressure vessel. The groove surrounds and is slightly spaced apart from the gas passage or opening such that the metal of the end plug or wall surface of the pressure vessel between or intermediate the groove and the gas passage or opening provides filler material for filling and sealing the gas passage or opening when subjected to appropriate welding conditions, such as, for example, tungsten-inert gas or laser or electron beam welding conditions.

Similarly, the conical rise surrounds the gas passage or fill hole opening such that the metal of the conical rise provides the filler material for filling and sealing the gas passage or fill hole opening when subjected to appropriate welding conditions, such as, for example, tungsten-inert gas or laser or election beam welding conditions.

Another aspect of this invention is a novel fill head/welding apparatus for accomplishing such process of supplying and filling a pressure vessel with an inert gas through a gas passage or opening in the wall surface of the pressure vessel to a high level of gas pressurization and then weld sealing said gas passage or opening, wherein said fill head/welding apparatus requires no moving parts. The fill head/ welding apparatus surrounds and sealingly engages a portion of the outer metal wall surface of the pressure vessel containing the gas passage or opening and the groove or conical rise surrounding the gas passage or fill hole opening. The apparatus comprises a housing providing a chamber, said housing having a gas inlet, a gas outlet and an electrode port. A suitable welding element is fixedly mounted in the apparatus housing and extends into the electrode port in the housing to a location essentially adjacent the gas passage or opening in the pressure vessel wall on which the fill head/welding apparatus is sealingly engaged.

The various features of the invention are illustrated by the accompanying drawings and descriptive matter of a preferred embodiment of the invention. For purposes of illustration, the invention is illustrated by employing tungsten-inert gas arc welding of a gas passage in an airbag inflator pressure vessel.

DETAILED DESCRIPTION OF THE INVENTION

Figure 1:
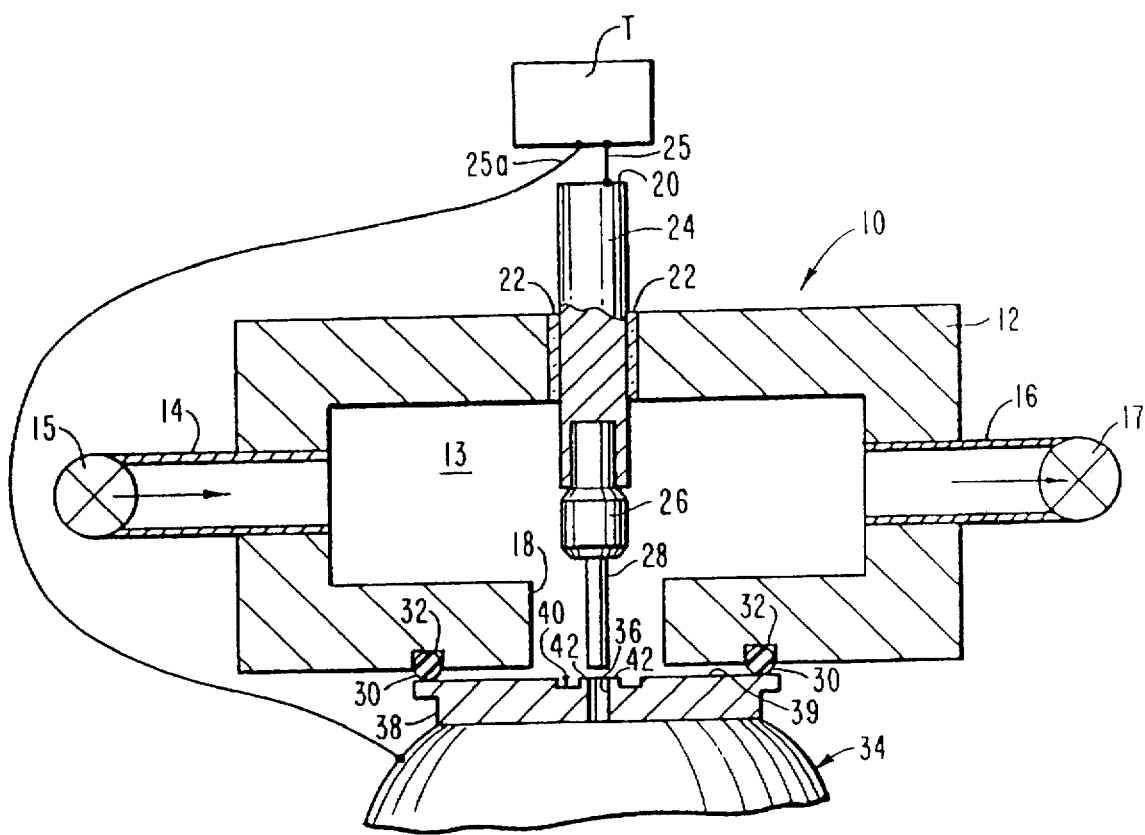
FIG. 1 is a partial cross-sectional elevational view of a fill head/welding apparatus of this invention mounted on a wall surface of an airbag inflator pressure vessel having a groove feature formed in the end plug or wall surface of the pressure vessel.

The Figures illustrate preferred embodiments of a fill head/welding apparatus and its use for weld sealing a gas passage opening in an inflator airbag pressure vessel. The fill head/welding apparatus 10 comprises a housing 12 providing a chamber 13. The housing is provided with a gas supply inlet 14, a gas outlet 16 and a welding energy or electrode port or opening 18. A suitable valve 15 is provided in gas inlet 14 for dispensing inert gas under high pressure from a source of pressurized inert gas, not shown. A suitable valve 17 is provided in gas outlet 16 to prevent discharge of gas during filling of a pressure vessel and during welding operations and for bleeding gas from the device at the appropriate time. If desired, gas inlet 14 and gas outlet 16 may be combined in one (the same) valved line opening into the housing 12. A suitable welding element 20, such as a tungsten-inert gas arc welding element, is fixedly mounted in said housing 12 and extends into the electrode port 18. The electrode element 20 is fixedly mounted in the housing in an electrically insulated manner, such as by means of a temperature resistant, electrically insulating glass interface 22 between the electrode element 20 and the housing 12. Any suitable interface 22 may be employed. For example, instead of the glass interface one could use an O-ring sealed ceramic insert. Any non-conducting isolation material capable of providing a high pressure seal may be employed.

Electrode element 20 may comprise an electrically conductive terminal 24, such as a copper terminal, and releasably attached to terminal 24 a suitable collet body 26 for engaging a collet (not shown) for engaging and holding a tungsten electrode rod 28. Terminal 24 is preferably copper for greater conductivity of current, however, terminal 24 may be and is preferably clad with about 0.002 to 0.004 inch of an alloy on its outer surface, such as 52 Alloy, to obtain a better seal between copper terminal 24 and the glass interface 22. The collet body 26 and collet (not shown) are also preferably copper. Terminal 24 is connected by current lead line 25 to a transformer T of a welding machine to supply welding current at a predetermined time and vessel 39 or wall 38 thereof is grounded by ground line 25a connected to transformer T.

The portion of the fill head/welding apparatus housing wall 12 intended to sealingly contact a wall portion of a pressure vessel is provided with suitable O-ring seals 30 in appropriately spaced and sized O-ring receiving notches When it is desired to pressurize and weld seal a pressure vessel, such as an airbag inflator pressure vessel or the like, the aforedescribed fill head/welding apparatus is brought into suitable sealing engagement with the appropriate outer wall or end plug portion 38 of the pressure vessel 34. As illustrated in FIG. 1, a suitable inflator pressure vessel 34 to be pressurized with inert gas to a pressure of at least 2850 psi or greater has a gas passage or opening 36 in an outer metal wall 38 of said pressure vessel 34 for admitting gas under pressure to the inflator pressure vessel. A groove 40 is provided on the metal outer wall surface 39, said groove 40 circumferentially surrounding and being slightly spaced apart from the gas passage 36 thereby providing a raised metal ridge portion 42 intermediate groove 40 and gas passage 36. Such groove feature 40 may be provided in any suitable manner, such as by machining said feature in the metal wall surface 39.

Figure 2:
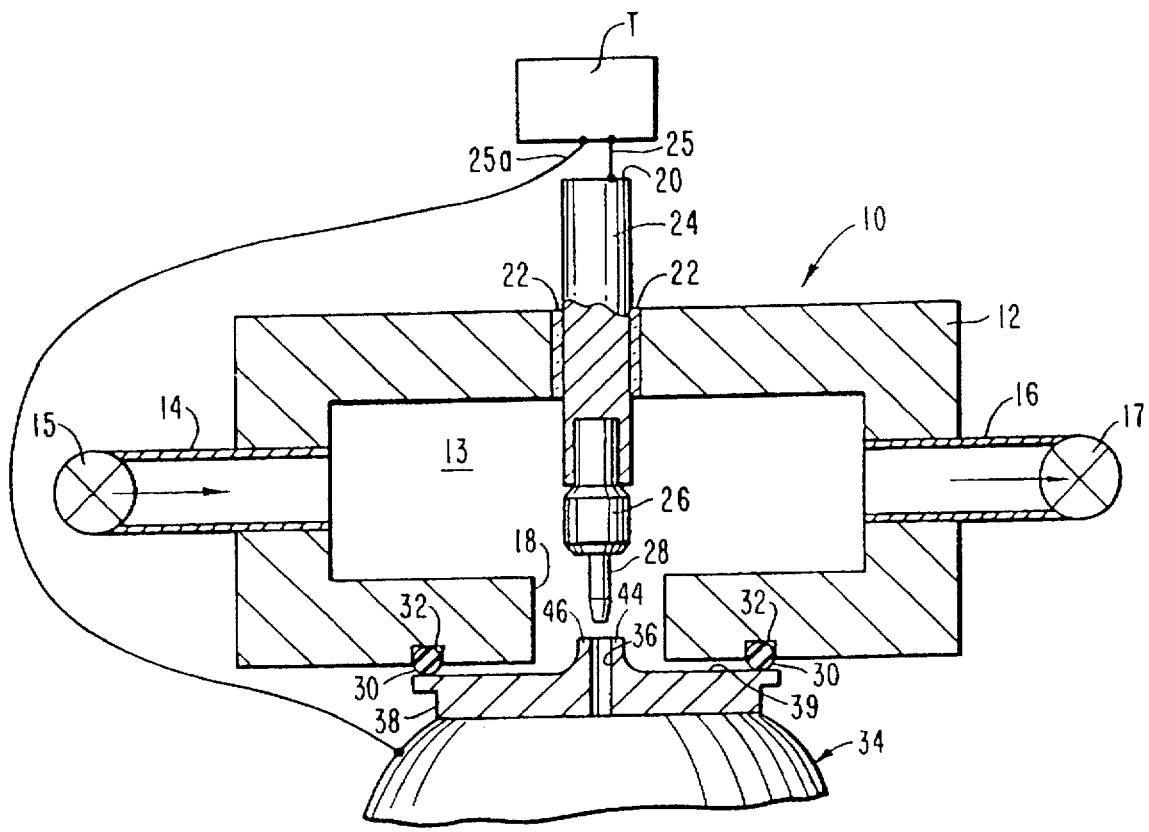
FIG. 2 is a partial cross-sectional elevational view of a fill head/welding apparatus of this invention mounted on a wall surface of an airbag inflator pressure vessel having a conical rise feature formed in the end plug or wall surface of the pressure vessel.

As illustrated in FIG. 2, a suitable inflator pressure vessel 34 to be pressurized with inert gas to a pressure of at least 2850 psi or greater has a gas passage or opening 36 in an outer metal wall 38 of said pressure vessel 34 for admitting gas under pressure to the inflator pressure vessel. A conical rise feature 44 is provided on the metal outer wall or end plug surface 39, said conical rise 44 circumferentially surrounding the gas passage 36 thereby providing a raised metal ridge portion 46 surrounding gas passage 36. Such conical rise feature 44 may be provided in any suitable manner, such as by machining or stamping said feature in the metal wall surface 39.

The pressure vessel 36 and fill head/welding apparatus 10 may be held in a sealingly engaged position by any suitable holding means (not shown), such as by clamps or other positive locking device to hold the pressure vessel and fill head/welding apparatus in place and in a stable position during the gas filling and welding operation. The fill head/welding apparatus 10 and the pressure vessel wall surface 39 are brought into sealing engagement by an appropriate holding means holding the O-ring seal 30 in sealing arrangement with wall surface 39 so that the O-rings 30 are compressed sufficiently such that the resulting seal surrounds groove 40 or conical rise 44 and gas passage 36 isolating the electrode port 18, groove 40 or conical rise 44 and gas passage 36 from ambient pressure and to ensure no gas leakage occurs and to prohibit shorting or arcing at the time of the welding operation.

Valves 15 and 16 are operable in any suitable manner, generally manually or electrically energizable solenoid valves, to admit or not admit gas from the source of supply or to release gas from the fill head/welding apparatus, respectively. Preferably, switches for valves 15 and 16 and the transformer T of a welding machine are operated by a programmable controller to operate the various switches in proper sequence.

For a typical mild steel (9310) inflator pressure vessel 34, gas passage 36 is generally about 0.090 inch in diameter, and groove 40 is about 0.050 inch wide and about 0.050 inch deep in a 0.300 inch thick wall 38. To pressurize such a pressure vessel 34 and weld seal such a gas passage 36, one can utilize a 3/32 inch tungsten electrode rod 28 and use a welding current of 250 amps for about 1.2 seconds or less, preferably about 0.5 seconds or less, supplied by a Weldlogic AWS 1000 Model welding machine. Typically, the electrode rod 28 is positioned from about 0.020 to about 0.060 inch from the surface 39 of wall 38 of the inflator pressure vessel 34.

It will be appreciated that the current and time required, and electrode rod size, will be dependent upon numerous factors, such as, the size of the gas passage 36 and groove 40 or 46 and conical rise 44, the amount of metal in ridge portion 42 or 46 and the type of metal of which pressure vessel wall 38 and thus ridge 42 or 46 are composed. Generally one will balance the welding time, welding current and amount of filler material in ridge 42 or 46 to get a weld time of 0.5 seconds or less in order to minimize any expansion of the inert gas which can lead to weld deformation, cracks or porosity developing in the weld. Also, any pressure differential between the gas pressure in chamber 13 and the gas pressure in pressure vessel 34 due to the heating during the welding operation could, if desired, be eliminated by providing a pressure-valve accumulator in the fill head/welding apparatus to equalize the said pressures.

If such a pressure vessel is desired to be filled with inert gas and sealed to a pressure level within the range of about 2850 to about 3500 psi in the vessel, the pressure vessel can, if desired, first be charged to a pressure level of about 5000 to 5200 psi to test the integrity of the pressure vessel, then bleed off gas through outlet 16 and valve 17 until the desired final pressure level is obtained. Then, the gas opening 36 can be sealed.

The inert gas for filling pressure vessel is generally argon or helium since said inert gases can be utilized to provide the inert gas environment for tungsten-inert gas or plasma arc welding of the pressure vessel gas passage.

Typical operation of the apparatus according to the method of this invention may be described as follows, when it is desired to fill an airbag inflator pressure vessel with an inert gas and weld seal the gas passage in said pressure vessel wall after the pressure vessel has been charged or pressurized with the inert gas. Outer wall 39 of pressure vessel 34 and fill head/welding apparatus 10 are brought into sealing engagement as shown in the drawing Figures whereby the O-ring seals 30 sealingly surround groove 40 and gas passage 36. Valve 17 in gas outlet 16 is closed and valve 15 in gas inlet 14 is then opened to permit high pressure inert gas, such as argon or helium, to enter gas inlet 14, chamber 13, electrode port 18 and gas passage 36 to fill inflator pressure vessel 34 to the desired pressure level. Then, valve 15 is closed. For example, the inert gas can be permitted to reach a pressure level of about 5000 to 5200 psi to pressure test the pressure vessel 34. After the pressure test of the vessel 34 has been successfully performed, the pressure in the system can be reduced to the desired final pressure of, for example, a pressure within the range of about 2850 to 3500 psi by bleeding inert gas through valve 17 in gas outlet 16 by appropriate opening of said valve 17. Upon reaching the desired final pressure level, valve 17 is again closed. Sufficient welding energy is then supplied to the electrode element 20 and thus to tungsten electrode rod 28 for the necessary period of time to cause fusion of the metal in ridge 42 between groove 40 and gas passage 36 or in ridge 46 surrounding gas passage 36 to thereby weld seal gas passage 36 without providing any additional filler material for the weld sealing operation. After the weld seal operation has been completed, inert gas in the fill head/welding chamber 13 can be released through gas outlet 16 by opening valve 17. Thereafter, the fill head/welding apparatus 20 is removed from its sealing engagement with pressure vessel wall surface 39 by release of the locking or clamping device employed.

It will be readily understood and appreciated from the foregoing description that one may weld seal a gas passage or opening in a pressurized pressure vessel by employing the groove feature on the outer wall surface of the pressure vessel and then employing any suitable welding technique or appropriate apparatus to accomplish the weld seal. Thus, any suitable fill/weld apparatus may be employed with the grooved surface feature of this invention and, although it is not necessary to employ the aforedescribed novel fill head/welding apparatus of this invention, it is desirable and preferred to employ such apparatus.

It will also be readily understood and appreciated from the foregoing description that one may weld seal a gas passage or opening in a low or non-pressurized vessel by employing the groove feature on the outer wall surface of the vessel and by employing any suitable welding technique or appropriate apparatus, including the above-described apparatus to accomplish the weld seal. For example, if vessel 34 of the Figures was to be a vacuum vessel, valve 15 would be closed to close off inlet 14, and a vacuum drawn in vessel 34 by connecting gas outlet 16 to a vacuum source. In such a case, welding element 20 would preferably be a laser or electron beam welding element for sealing gas passage 36 in vessel 34 once the proper vacuum is drawn in vessel 34. In such a case where welding element 20 is a laser welding element or electron beam welding element, access port 18 may be a quartz glass window permitting passage of the welding energy from element 20 to ridge material 42 or 46. It will be appreciated that for use in sealing vacuum vessels the apparatus 10 need not have a gas inlet 14 or valve 15 and the apparatus could be modified to eliminate said components.

With the foregoing description of the invention, those skilled in the art will appreciate that modifications may be made to the invention without departing from the spirit thereof. Therefore, it is not intended that the scope of the invention be limited to the specific embodiments illustrated and described.

We claim:

1. Apparatus for surrounding and sealingly engaging a portion of an outer metal wall surface of an airbag module inflator pressure vessel, said surrounded portion of said outer metal wall surface provided with a gas passage therethrough and a conical rise in said portion of said outer metal wall surface, said conical rise surrounding said gas passage, said apparatus having no moving parts and comprising:

a housing providing a chamber, said housing having a gas inlet, a gas outlet and an electrode port;

a welding element fixedly mounted in said housing in an electrically insulated manner and extending into the electrode port in said housing to a location essentially adjacent a gas passage in a pressure vessel wall surface on which said apparatus is to be sealingly engaged for supplying sufficient welding energy to weld seal said gas passage without requiring addition of any filler material other than metal of said pressure vessel wall surface in said conical rise surrounding the gas passage.

2. The apparatus of claim 1 wherein the electrode element is mounted in said housing in an electrically insulated manner by means of an electrically insulated glass interface between the electrode element and the housing.

3. A method for supplying an inert gas under a pressure of about 2850 psi or greater to an airbag inflator pressure vessel having a gas passage in an outer metal wall surface of said pressure vessel through which inert gas is supplied to the inflator pressure vessel and weld sealing the gas passage after the inflator pressure vessel has been charged with inert gas, the method comprising:

(a) providing an airbag inflator pressure vessel having a gas passage in a conical rise located on an outer metal wall surface thereof, said conical rise surrounding the gas passage to provide an area of metal for providing filler material to weld seal said gas passage;

(b) providing a fill head/welding apparatus sealingly engaging a portion of said outer wall surface of the inflator pressure vessel and surrounding said conical rise and gas passage, said fill head/welding apparatus having no moving parts and comprising:

(1) a housing providing a chamber, said housing having a gas inlet, a gas outlet, and an electrode port;

(2) a welding electrode element fixedly mounted in said housing in an electrically insulated manner and extending into the electrode port in said housing to a location essentially adjacent the gas passage in the inflator pressure vessel wall surface on which the fill head/welding apparatus is sealingly engaged;

(c) filling the inflator pressure vessel with inert gas to a desired level of pressurization by supplying gas through the apparatus gas inlet, chamber and the gas passage of the pressure vessel;

(d) supplying sufficient welding energy to the welding electrode element of said apparatus to cause fusion of the metal of said conical rise to weld seal said gas passage with said metal providing the filler material for weld sealing of said gas passage;

(e) releasing through said gas outlet any gas remaining in said fill head/welding apparatus; and (f) removing said fill head/welding apparatus from said inflator pressure vessel.

4. The method of claim 3 wherein the electrode element is mounted in said housing in an electrically insulated manner by means of an electrically insulated glass interface between the electrode element and the housing.

* * * * *